United States Patent

Griston et al.

[11] Patent Number: 5,190,103
[45] Date of Patent: Mar. 2, 1993

[54] METERING OF TWO-PHASE FLUIDS USING FLOW HOMOGENIZING DEVICES AND CHEMICALS

[75] Inventors: Suzanne Griston, San Dimas; Ki C. Hong, Orange, both of Calif.

[73] Assignee: Chevron Research and Technology Company, San Francisco, Calif.

[21] Appl. No.: 811,104

[22] Filed: Dec. 20, 1991

[51] Int. Cl.$^5$ .................. E21B 43/24; E21B 47/00
[52] U.S. Cl. ................... 166/250; 73/861.04; 73/151; 166/303
[58] Field of Search .............. 73/151, 861, 861.04, 73/155; 166/252, 250, 272, 303

[56] References Cited

U.S. PATENT DOCUMENTS

| Re. 33,909 | 5/1992 | Brenner et al. | 73/861.04 X |
|---|---|---|---|
| 3,258,963 | 7/1966 | Bryant et al. | 73/861.04 X |
| 4,836,032 | 6/1989 | Redus et al. | 73/861.04 |
| 4,928,522 | 5/1990 | Tonnelli | 166/252 X |
| 4,958,684 | 9/1990 | Nguyen et al. | 166/252 |
| 4,974,452 | 12/1990 | Hunt et al. | 73/861.04 X |
| 5,035,146 | 7/1991 | Chien | 73/861.04 |

*Primary Examiner*—Stephen J. Novosad
*Attorney, Agent, or Firm*—E. A. Schaal; W. K. Turner

[57] ABSTRACT

A two-phase fluid is metered by injecting a surfactant into the two-phase fluid, homogenizing the fluid and surfactant with either a porous medium or an orifice plate to form a pseudo-single phase fluid, and metering the pseudo-single phase fluid. In one embodiment, both the injection of surfactant and the homogenization with either a porous medium or an orifice plate occur within one foot of where the pseudo-single phase fluid is metered. In another embodiment, the surfactant is injected at a wellhead and the metering occurs downhole.

12 Claims, 4 Drawing Sheets

SEGREGATED
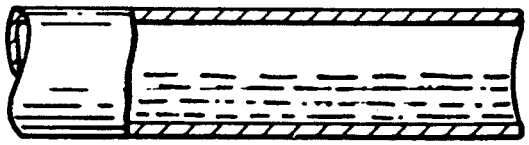
STRATIFIED
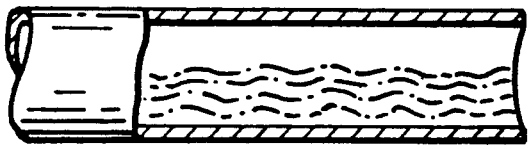
WAVY
ANNULAR
INTERMITTENT
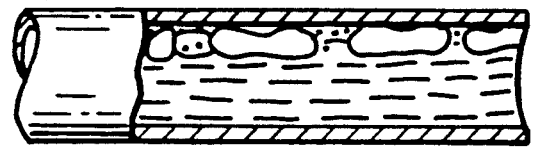
PLUG
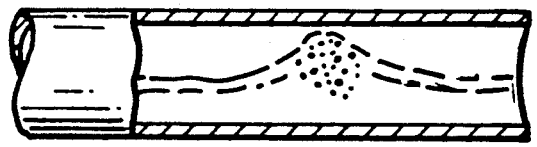
SLUG
DISTRIBUTED
BUBBLE
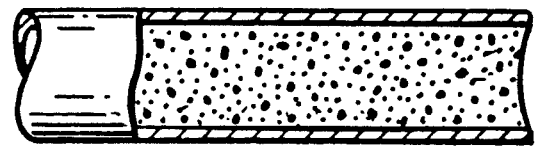
MIST
TWO-PHASE FLOW PATTERNS IN HORIZONTAL PIPE
FIG_1

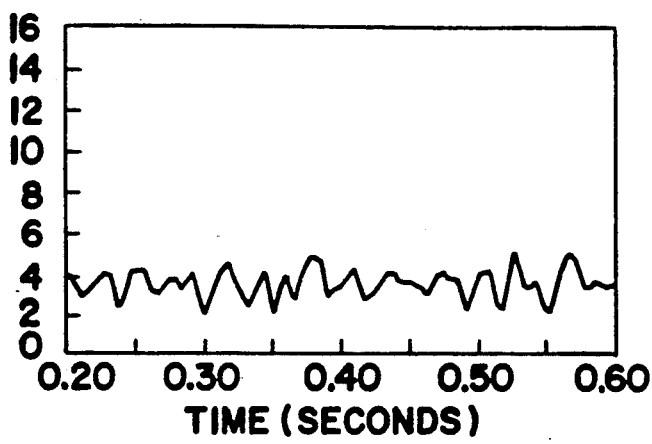
PRESSURE DROP FLUCTUATIONS FOR AIR-WATER STRATIFIED FLOW
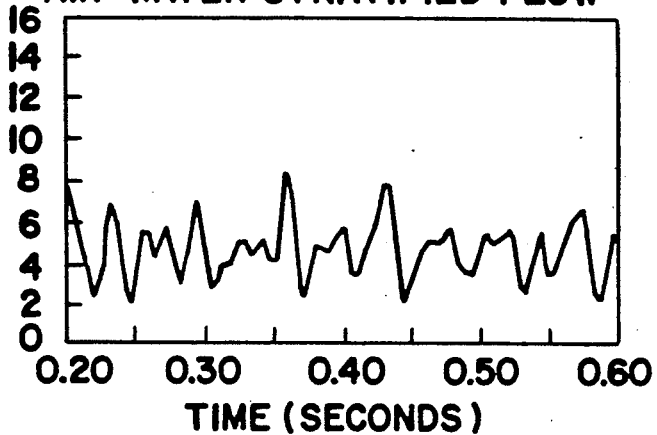
PRESSURE DROP FLUCTUATIONS FOR AIR-WATER ANNULAR FLOW
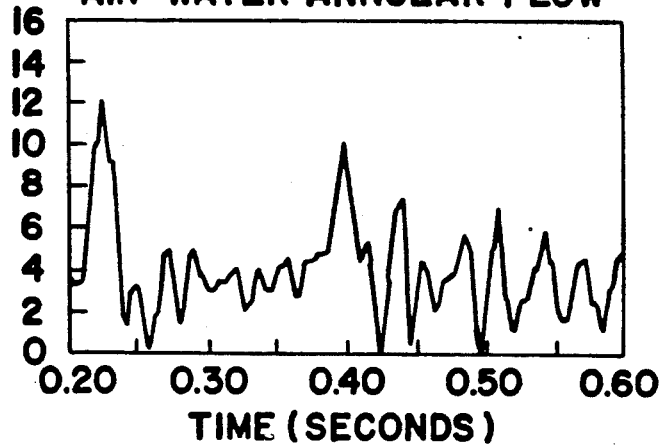
PRESSURE DROP FLUCTUATIONS FOR AIR-WATER SLUG FLOW
FLOW REGIME EFFECTS ON PRESSURE DROP ACROSS AN ORIFICE
FIG_2

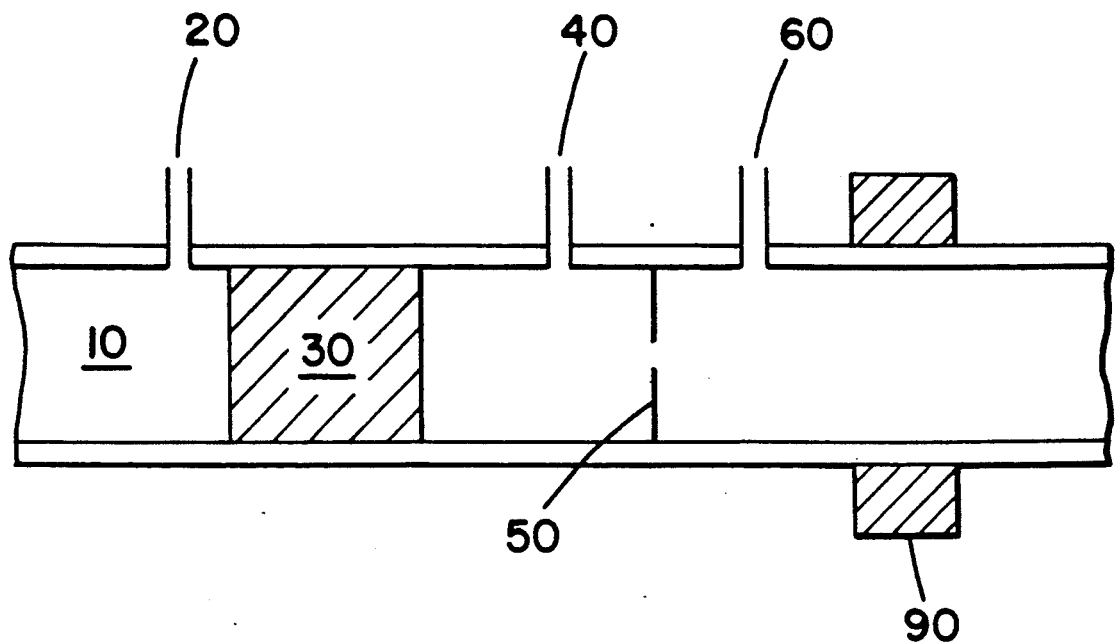
FIG_3

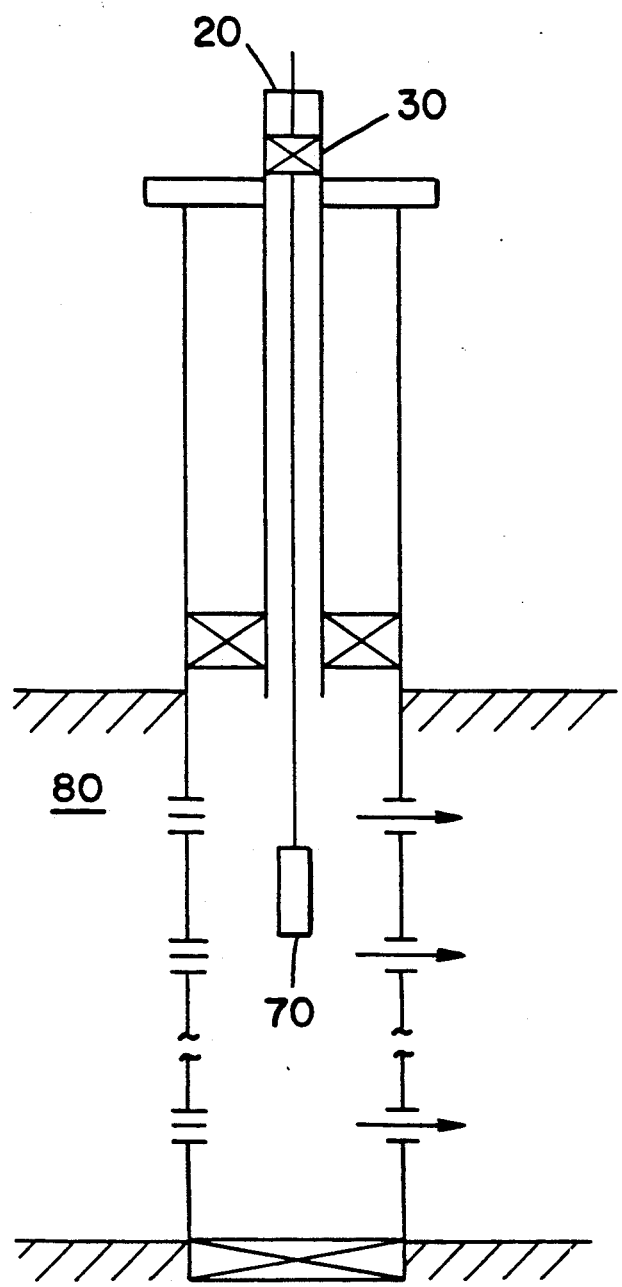
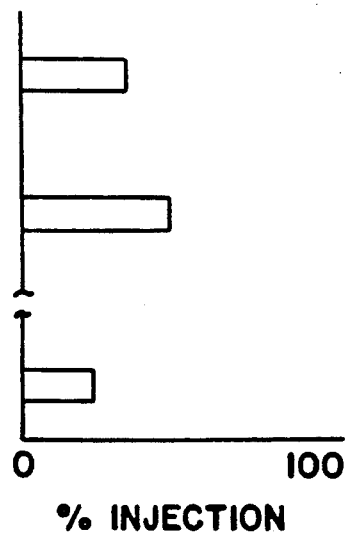
FIG_4  FIG_4a

METERING OF TWO-PHASE FLUIDS USING FLOW HOMOGENIZING DEVICES AND CHEMICALS

The present invention relates to the metering of two-phase flow (e.g., air-water, hydrocarbon gas-condensate, or wet steam). One application of the present invention is the metering of two-phase flows in surface pipelines. Another application is determining the locations and amounts of two-phase fluids leaving injection wellbores (e.g., steam injection profiling). In both of these applications, one needs to know both the total flowing rate and liquid volume fraction of the two-phase fluid.

BACKGROUND OF THE INVENTION

The dynamics of two-phase gas-liquid flow in pipes can be very complicated. Differences in the liquid and vapor densities and velocities create two-phase flow patterns or regimes, as shown in FIG. 1. These flow regimes can range from homogeneous bubble or mist flow to stratified flow to intermittent slug flow. The occurrence of a particular flow regime depends upon the amount of gas and liquid present in the pipe, their velocities, densities, and viscosities. Additionally, the flow regime can vary along the length of the pipe as a result of mass transfer between the vapor and liquid phases, as is the case when heat loss occurs in steam pipelines. The fluid dynamics created by such two-phase flow regimes make it very difficult to apply conventional single-phase metering methods reliably and accurately.

SURFACE METERING

The most straightforward method of determining total flowing rate and liquid vapor mass of a two-phase fluid is to measure the individual flow rates of the gas (vapor) and liquid phases. To date, the most reliable method of measuring the gas and liquid flow rates is to use a separator vessel designed to allow nearly complete segregation (over 98%) of the phases. The liquid will segregate to the bottom of the vessel, while the gas will segregate to the top of the vessel and conventional single-phase meters are used to determine the flow rates of the individual phases. Examples of conventional single-phase flow rate meters are orifice plates, turbines, and vortex shedders. Unfortunately, separators can be very costly to build and operate, and they require special manifolding and valving to install in a pipeline.

Recently, methods using an orifice or nozzle in series with a second device, such as a critical flow choke or densitometer, have been introduced for metering two-phase steam flows in surface pipelines. Although orifices and nozzles are commonly used to meter single phase fluids (e.g., gas, superheated steam), severe problems can occur when they are used to meter two-phase gas-liquid flows. The flow of segregated and intermittent mixtures (e.g., stratified, annular, and slug regimes) can dramatically affect pressure drop and greatly reduce the reliability and accuracy of the orifice meter results.

Examples of flow regime effects on pressure drop across an orifice are shown in FIG. 2 for air-water flows through a one inch Plexiglass pipe with a half inch orifice diameter. Large fluctuations in the pressure drop occur as a result of intermittent flow of water and air through the orifice. These fluctuations are most severe for annular and slug flow, where water slugs, at or near air velocity, periodically flow through the orifice. Conversely, the pressure drop caused by the flow of distributed or homogeneous mixtures through an orifice should be stable, since these flows are nearly single-phase. Previous attempts to homogenize two-phase gas-liquid flows have used mechanical devices installed upstream of metering devices. However, numerous studies have shown that the gas and liquid phases separate immediately upon leaving the homogenizing device.

WELLBORE PROFILING

Spinner and radioactive tracer surveys are the current methods used to obtain two-phase flow profiles in injection wells. These methods are routinely used for profiling single-phase water or gas injection and production wells. Running and interpreting spinner and tracer surveys are not straightforward for single-phase flow conditions, and are much more difficult when the complexities of two-phase flow conditions are added.

Spinner surveys incorporate the use of a turbine that rotates as fluid flows past it. In a single-phase flow, the rotation frequency (number of revolutions per second) of the turbine is proportional to the flow velocity. However, in two-phase flow, the spinner response is sensitive to variations in flow regime, which can result in large measurement errors. Spinner surveys, in fact, cannot clearly identify profiles for the individual gas and liquid phases.

The radioactive tracer method is less sensitive to changes in flow regime and can provide profiling information for both the gas and liquid phases. The "Velocity Shot" method is used to determine the vapor flow profile and the "Plating" method is used to determine the liquid flow profile.

The "Velocity Shot" method consists of injecting a fixed amount (slug) of radioactive krypton, xenon, or methyl iodide to trace the flowing gas phase and recording the transit time of the slug between two downhole radiation detectors spaced a fixed distance apart. The dual detector tool is then lowered to the next location and another tracer slug is injected, and so on. The vapor injection profile is obtained from comparison of the transit times at different depths.

The "Plating" method consists of running an initial survey to determine background radiation levels in the wellbore and surrounding reservoir. A slug of radioactive substance (e.g., sodium iodide) is injected to trace the flowing liquid phase and allowed to plate out in the surrounding reservoir. Several surveys are subsequently run over the injection interval and the radiation intensity is recorded. The liquid injection profile is determined from comparison of changes in the radiation intensity over time at different depths.

However, these methods are not nearly as reliable and accurate for two-phase flows as they are for single-phase flows. The gas flow area may change across the injection interval as the flow regime changes, resulting in additional uncertainties in the gas profile. Liquid profiles obtained from the plating method are generally considered to be qualitative, not quantitative.

SUMMARY OF THE INVENTION

The present invention involves metering a two-phase fluid, such as wet steam, by injecting a surfactant into the two-phase fluid to form a "pseudo-single phase" fluid, and metering that pseudo-single phase fluid. By making a two-phase fluid into a pseudo-single phase fluid, one can apply existing single-phase rate metering methods with vapor fraction detectors.

To further the action of the surfactant, a mechanical mixing device may be used just upstream of the detection point or the injection sandface. That mixing device can be a porous medium, static mixer, or orifice plate. Both the surfactant injection and the mechanical mixing should occur within one foot upstream of where the pseudo-single phase fluid is metered.

The present invention overcomes the difficulties mentioned above by turning a two-phase fluid into a pseudo-single phase. Once that pseudo-single phase is created, single-phase metering devices may be used to determine the flow rate and flowing liquid volume fraction accurately. When a pseudo-singe phase is injected, the quality of the injected fluid would be uniform over the injection interval, and uncertainties associated with flow regime effects are greatly reduced. Therefore vapor tracers or spinner surveys will indicate the distribution of both liquid and vapor injections.

In one embodiment, the surfactant is injected at a wellhead and the metering occurs downhole. In that embodiment, the surfactant and fluid are homogenized with a mechanical mixing device at the wellhead.

BRIEF DESCRIPTION OF THE DRAWINGS

In order to assist the understanding of this invention, reference will now be made to the appended drawings. The drawings are exemplary only, and should not be construed as limiting the invention.

FIG. 1 is a schematic drawing of various two-phase flow regimes.

FIG. 2 shows plots of flow regime effects on pressure drop across an orifice for air-water flows through a one inch Plexiglass pipe with a half inch orifice diameter.

FIG. 3 is a schematic drawing of one embodiment of surface metering.

FIGS. 4 and 4a are schematic drawings of one embodiment of wellbore profiling.

DETAILED DESCRIPTION OF THE INVENTION

In its broadest aspect, the present invention involves metering a two-phase fluid by injecting a surfactant into the fluid to form a pseudo-single phase fluid, and metering the pseudo-single phase fluid.

By "pseudo-single phase fluid," we mean a two-phase fluid wherein the "two-phase" nature of that fluid is sufficiently homogenized so that a small sample of the fluid has the same composition and properties of the entire fluid. Examples of "pseudo-single phase" fluids are foam and mist.

By "surfactant," we mean a surface-active substance that alters the surface properties of a fluid to which it is added. Such a substance can produce foam or other pseudo-single phase fluids when injected into a two-phase fluid. Examples of surfactants include alkyl aromatic sulfonates, alpha olefin sulfonates and derivatives including dimers, alkyl diphenylether disulfonates or sulfonates, alkyl naphthalene sulfonates, and alcohol ethoxysulfates. Examples of particular surfactants that would work are Chaser CS1010, Chaser SD1000, and Chaser SD1020, which are all trademarked products of Chevron Chemical Company, and which have high active concentrations (50% active) and the ability to foam at steam injection conditions.

Preferably, when the liquid volume fraction of the two-phase fluid is at least 0.05, a "high foaming surfactant" is injected into the two-phase fluid to generate foam just upstream of the metering device or near the injection sandface. By "high foaming surfactant," we mean a surfactant that, when added, alters the surface properties of the two-phase fluid so as to produce a foam. Examples of "high foaming" surfactants are Chaser SD1000 and Chaser SD1020, which are trademarked products of Chevron Chemical Company.

When the liquid volume fraction of the two-phase fluid is less than 0.03, a "less active surfactant" may be used instead, to turn the flowing fluid into a mist flow regime. By "less active surfactant," we mean a surfactant that, when added to the liquid phase of a two-phase fluid, mainly alters the viscosity of the liquid phase, allowing the liquid phase to be entrained in the gas phase as small droplets. Examples of "less active" surfactants are hydrocarbon solvent or Chaser CS1010, which is a trademarked product of Chevron Chemical Company.

To best form a pseudo-single phase fluid, the surfactant and two-phase fluid are homogenized with a mechanical mixing device prior to metering. Examples of mechanical mixing devices include porous medium or an orifice plate. Preferably, both the injection of surfactant and the homogenization with mechanical mixing occur within one foot upstream of where the pseudo-single phase fluid is metered so that the fluid will stay pseudo-single phase.

By transforming two-phase flow into a pseudo-single phase flow, one can apply conventional single-phase metering methods and vapor fraction detection methods to accurately determine flowing rate and liquid volume fraction of the two-phase fluid. Examples of such conventional single-phase rate metering methods include orifice plates, turbines, and vortex shedders. Examples of vapor fraction detection methods include vibrating densitometers and radiation detectors.

When used in surface metering, the surfactant is injected into the pipeline upstream of the meter. A mechanical mixing device can be installed downstream of the chemical injection and upstream of the metering device, or it can be incorporated as part of the metering device.

Referring to FIG. 3, which shows one embodiment of surface metering, a two-phase fluid flows through pipe 10. Surfactant is injected at point 20, and the fluid and surfactant is mixed in mixer 30 to form a pseudo-single phase. The pseudo-single phase passes through orifice plate 50 and vapor fraction detector 90, and the pressure of that pseudo-single phase is measured before the orifice plate, at pressure tap 40, and after the orifice plate, at pressure tap 60.

In the application to wellbore profiling, the surfactant is injected at the wellhead, while the meter is positioned downhole. A mechanical mixing device can be added at the wellhead, downstream of chemical injection. In wellbore profiling, it is essential that the two-phase fluid remains homogenized at least until it has been metered downhole.

Referring to FIG. 4, which shows one embodiment of wellbore profiling, a two-phase fluid flows through pipe 10. Surfactant is injected at point 20, and the fluid and surfactant is mixed in mixer 30 to form a pseudo-single phase. The pseudo-single phase is injected into the well, and the pseudo-single phase is metered downhole at 70 and distributed into the formation 80. The injection profile 35 is determined from downhole measurements at 70.

While the present invention has been described with reference to specific embodiments, this application is intended to cover those various changes and substitutions that may be made by those skilled in the art without departing from the spirit and scope of the appended claims.

What is claimed is:

1. A method of metering a two-phase fluid comprising:
   a) injecting a surfactant into the fluid to form a pseudo-single phase fluid, and
   (b) metering the pseudo-single phase fluid.

2. A method according to claim 1 wherein the two-phase fluid is wet stream.

3. A method according to claim 1 wherein the surfactant and two-phase fluid are homogenized with a mechanical mixing device prior to metering.

4. A method according to claim 3 wherein the mechanical mixing device is a porous medium.

5. A method according to claim 3 wherein the mechanical mixing device is an orifice plate.

6. A method according to claim 3 wherein the mechanical mixing device is a static mixer.

7. A method according to claim 3 wherein both the injection of surfactant and the homogenization with mechanical mixing occur within a foot upstream of where the pseudo-single phase fluid is metered.

8. A method according to claim 1 wherein the surfactant is injected at a wellhead and the metering occurs downhole.

9. A method according to claim 8 wherein the surfactant and fluid are homogenized with a mechanical mixing device at the wellhead.

10. A method according to claim 9 wherein the mechanical mixing device is a porous medium.

11. A method according to claim 9 wherein the mechanical mixing device is an orifice plate.

12. A method according to claim 9 wherein the mechanical mixing device is a static mixer.

* * * * *